US010572861B2

United States Patent
Mihara et al.

(10) Patent No.: US 10,572,861 B2
(45) Date of Patent: *Feb. 25, 2020

(54) MAINTENANCE SUPPORT METHOD, MAINTENANCE SUPPORT SYSTEM, AND MAINTENANCE SUPPORT PROGRAM

(71) Applicant: Kabushiki Kaisha Toshiba, Tokyo (JP)

(72) Inventors: Shinya Mihara, Kanagawa (JP); Ayaka Nakanishi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/245,853

(22) Filed: Jan. 11, 2019

(65) Prior Publication Data

US 2019/0147414 A1    May 16, 2019

Related U.S. Application Data

(62) Division of application No. 15/453,072, filed on Mar. 8, 2017, now Pat. No. 10,217,088.

(30) Foreign Application Priority Data

Mar. 8, 2016    (JP) .................................. 2016-044745

(51) Int. Cl.
*G06Q 10/00* (2012.01)
*G06F 3/01* (2006.01)
(Continued)

(52) U.S. Cl.
CPC ............. *G06Q 10/20* (2013.01); *G06F 3/013* (2013.01); *G06F 3/04815* (2013.01);
(Continued)

(58) Field of Classification Search
CPC .......... G06Q 10/00; G06Q 10/20; G06K 7/14; G06K 7/1417; G06K 9/00604; G06K 9/00;
(Continued)

(56) References Cited

U.S. PATENT DOCUMENTS 5,610,678 A * 3/1997 Tsuboi ................. G02B 27/017
                                                                 348/341
9,530,057 B2 * 12/2016 Conner ................ G06K 9/3216
(Continued)

FOREIGN PATENT DOCUMENTS

| EP | 3112993 A1 | 1/2017 |
| JP | 2004-021931 A | 1/2004 |
| JP | 2004-102727 A | 4/2004 |
| JP | 2012-185685 A | 9/2012 |

(Continued)

OTHER PUBLICATIONS

Office Action issued in related EP Application No. 17159885.7, dated Jul. 20, 2017 (12 pages).

*Primary Examiner* — Anand P Bhatnagar
(74) *Attorney, Agent, or Firm* — Baker Botts L.L.P.

(57)    ABSTRACT

According to one embodiment, a maintenance support method is performed by a wearable device including a first camera and a second camera, and an information processing apparatus. The method includes causing the wearable device to detect identification information of a maintenance target position from a first image shot by the first camera and transmit the identification information and a second image shot by the second camera to the information processing apparatus in correspondence with the detection of the identification information. The method includes causing the information processing apparatus to determine, based on the second image, a situation of a user who wears the wearable device, and record the situation of the user in association with the identification information.

9 Claims, 4 Drawing Sheets

(51) Int. Cl.
*G06F 3/0481* (2013.01)
*G06K 9/00* (2006.01)
*G06K 7/14* (2006.01)

(52) U.S. Cl.
CPC ....... *G06K 7/1417* (2013.01); *G06K 9/00604* (2013.01); *G06K 9/00671* (2013.01)

(58) Field of Classification Search
CPC .. G06K 9/00671; G06F 3/013; G06F 3/04815
See application file for complete search history.

(56) References Cited

U.S. PATENT DOCUMENTS

| | | | | |
|---|---|---|---|---|
| 9,759,917 | B2* | 9/2017 | Osterhout | G02B 27/0093 |
| 9,875,406 | B2* | 1/2018 | Haddick | G02B 27/017 |
| 2003/0200058 | A1* | 10/2003 | Ogawa | G02B 27/017 |
| | | | | 702/184 |
| 2005/0024388 | A1* | 2/2005 | Takemoto | G06T 19/006 |
| | | | | 345/633 |
| 2005/0150738 | A1 | 7/2005 | Hallowell et al. | |
| 2006/0090135 | A1 | 4/2006 | Fukuda | |
| 2012/0019664 | A1* | 1/2012 | Watanabe | H04N 5/232 |
| | | | | 348/169 |
| 2012/0183137 | A1* | 7/2012 | Laughlin | H04N 7/185 |
| | | | | 380/200 |
| 2012/0231427 | A1 | 9/2012 | Kitamura et al. | |
| 2014/0240484 | A1* | 8/2014 | Kodama | G02B 27/017 |
| | | | | 348/86 |
| 2014/0349256 | A1* | 11/2014 | Connor | G09B 19/0092 |
| | | | | 434/127 |
| 2014/0354532 | A1* | 12/2014 | Mullins | G06F 3/015 |
| | | | | 345/156 |
| 2014/0368980 | A1* | 12/2014 | Nanavati | G06Q 30/016 |
| | | | | 361/679.03 |
| 2015/0138595 | A1* | 5/2015 | Sugimoto | H04N 1/0044 |
| | | | | 358/1.15 |
| 2015/0248826 | A1* | 9/2015 | Hahn | G05B 19/409 |
| | | | | 340/539.11 |
| 2015/0339858 | A1 | 11/2015 | Nakamura | |
| 2016/0261840 | A1* | 9/2016 | Nakashima | H04N 9/735 |
| 2016/0357491 | A1* | 12/2016 | Oya | G02B 27/0172 |
| 2017/0039423 | A1 | 2/2017 | Cork et al. | |

FOREIGN PATENT DOCUMENTS

| | | |
|---|---|---|
| JP | 2013-016020 A | 1/2013 |
| JP | 2014-119786 A | 6/2014 |

* cited by examiner

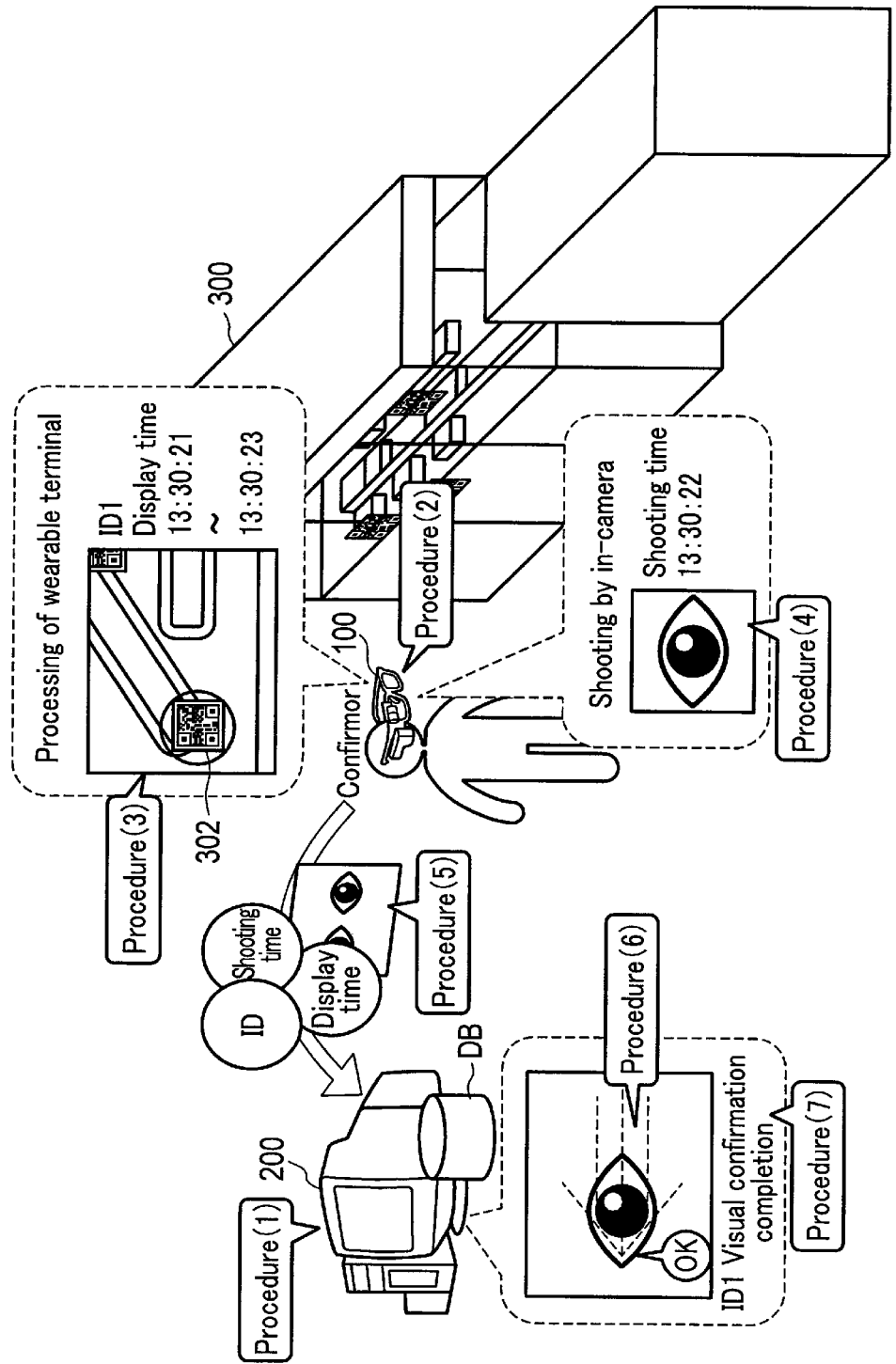
F I G. 2

MAINTENANCE SUPPORT METHOD, MAINTENANCE SUPPORT SYSTEM, AND MAINTENANCE SUPPORT PROGRAM

CROSS-REFERENCE TO RELATED APPLICATIONS

This application is a divisional application of U.S. application Ser. No. 15/453,072, filed Mar. 8, 2017 which is based upon and claims the benefit of priority from Japanese Patent Application No. 2016-044745, filed Mar. 8, 2016, the entire contents of which are incorporated herein by reference.

FIELD

Embodiments described herein relate generally to a maintenance support method, a maintenance support system, and a maintenance support program.

BACKGROUND

To inspect a conveyance path in a paper sheet processing system, a periodical maintenance operation is performed in which a confirmer virtually confirms the conveyance path during an operation. The confirmer visually confirms whether a foreign substance, a residue, an abnormality, or the like exists in the conveyance path, and records the result of the maintenance operation on paper such as a checklist. The visual inspection by the confirmer is completed by submitting the paper. That is, the result and record of the execution of the maintenance operation hold based on the trust relationship between the confirmer and a manager.

Additionally, there is known a technology of performing communication between an operation terminal and a central control unit placed away from the place of operation and displaying operation information on the operator terminal to increase the efficiency of the maintenance operation.

In the above-described maintenance declaration by the confirmer, however, the confirmer cannot be prevented from making an unfair practice. The result and record of execution of the maintenance operation hold based on the trust relationship between the confirmer and the manager. Whether the execution record is correct depends on the confirmer. For this reason, even if the confirmer makes an execution record without any visual confirmation or alters an execution record, there is no means for detecting and preventing the act.

In addition, it is impossible to prevent a human error in making an entry in a checklist. Since the confirmer makes an entry of a visual inspection execution record by manual input, it is impossible to prevent an entry error or mix-up of an inspection item by a human error. For example, a case may occur in which a conveyance path A is visually confirmed, but a checkmark is erroneously entered for a conveyance path B in the checklist, or the conveyance path A should be confirmed as an inspection item, but the confirmer confirms a conveyance path C by mistake and records "visual inspection was done for the conveyance path A".

In addition, the angle of viewing changes depending on the individual. Even if a point to be visually inspected is determined in advance, and the procedure of visual inspection is standardized, the angle at which the confirmer views the point changes depending on the individual. Hence, the quality of visual inspection changes depending on the individual, and it is impossible to force the confirmer to view the inspection point from a designated angle and position. Even if the confirmer is educated to the angle or position to view in advance, whether the confirmer views as designated in actual visual inspection depends on the confirmer.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a conceptual view showing an example of maintenance support processing by the maintenance support system according to the embodiment;

DETAILED DESCRIPTION

In general, according to one embodiment, a maintenance support method is performed by a wearable device including a first camera and a second camera, which shoot different directions, and an information processing apparatus. The method includes causing the wearable device to detect identification information of a maintenance target position from a first image shot by the first camera and transmit the identification information and a second image shot by the second camera to the information processing apparatus in correspondence with the detection of the identification information. The method includes causing the information processing apparatus to receive the identification information and the second image, determine, based on the second image, a situation of a user who wears the wearable device, and record the situation of the user in association with the identification information.

Figure 1:
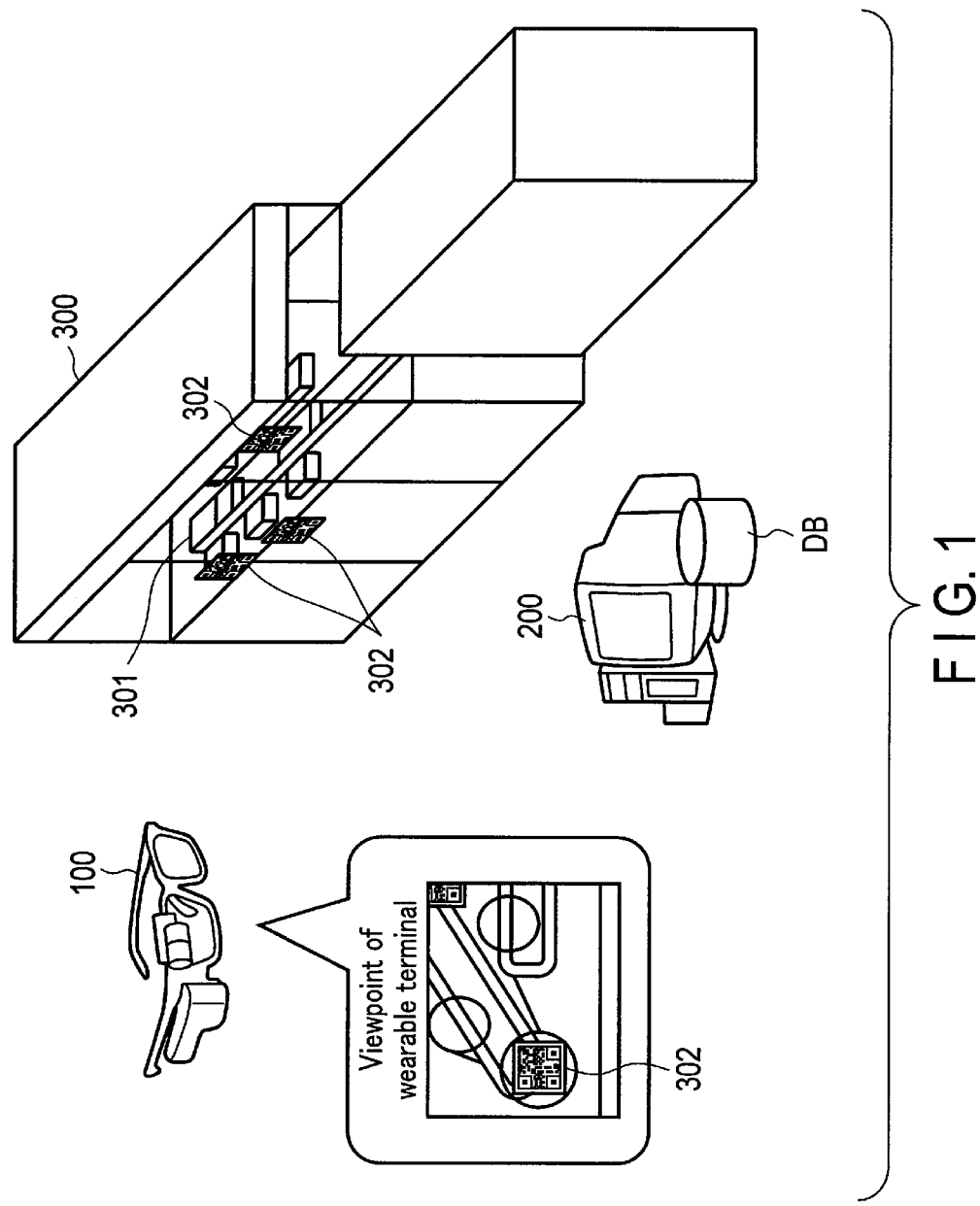
FIG. 1 is a conceptual view showing an example of a maintenance support system according to the embodiment.
Figure 3:
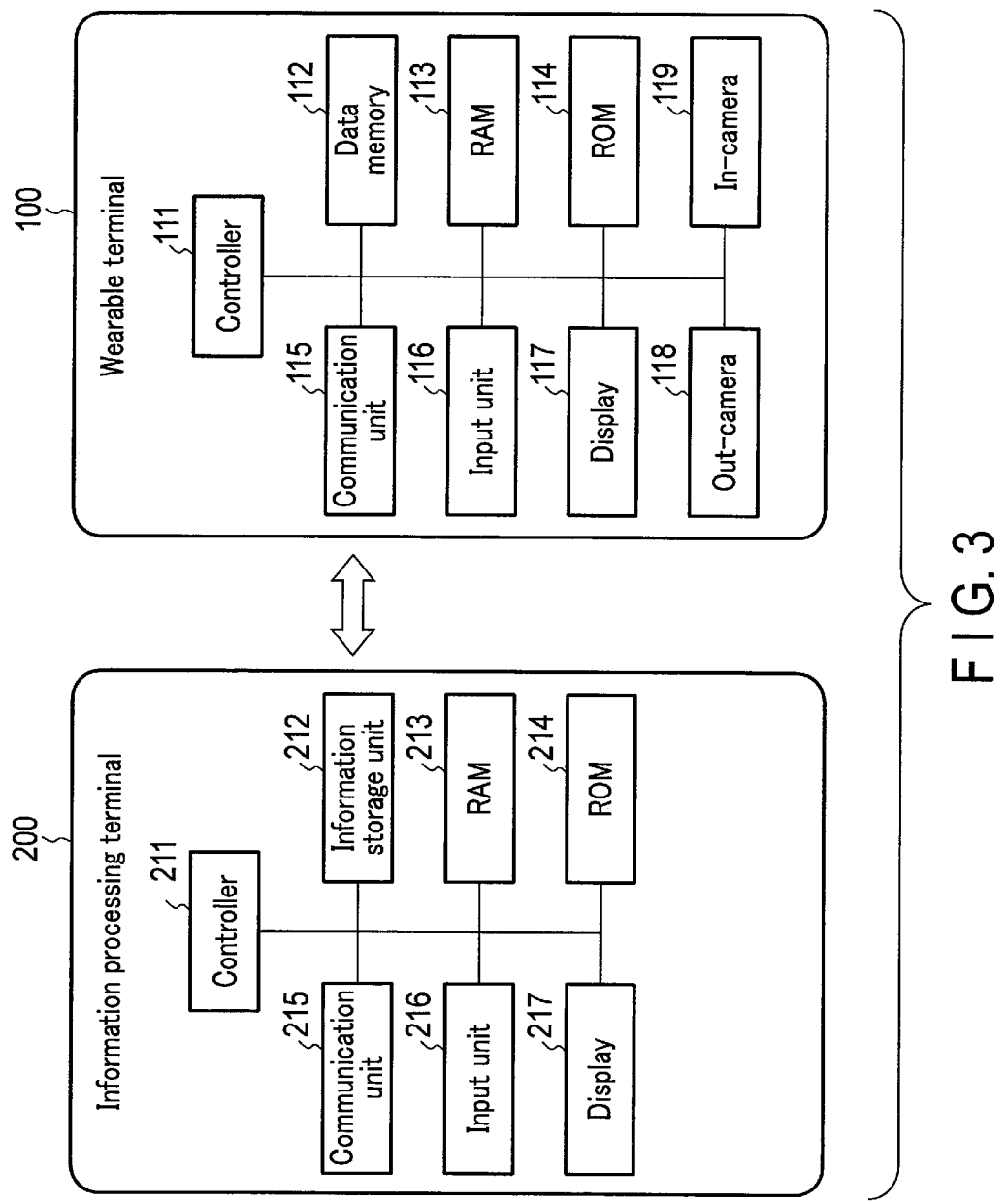
FIG. 3 is a block diagram showing an example of the maintenance support system according to the embodiment.

FIG. 1 is a conceptual view showing an example of a maintenance support system according to the embodiment. FIG. 2 is a conceptual view showing an example of maintenance support processing by the maintenance support system according to the embodiment. FIG. 3 is a block diagram showing an example of the maintenance support system according to the embodiment.

As shown in FIGS. 1, 2, and 3, the maintenance support system includes a wearable terminal (wearable device) 100 used by a confirmer (customer engineer), and an information processing terminal (information processing apparatus) 200 that communicates with the wearable terminal 100 and records a maintenance operation such as visual inspection.

For example, the wearable terminal 100 is a glass-type terminal including an out-camera and an in-camera, which shoot different directions. Note that the wearable terminal 100 may be an electronic device such as a smartphone or a tablet terminal. The confirmer wears the wearable terminal 100 and views a maintenance target device 300 such as a paper sheet processing system for processing paper sheets. On a plurality of maintenance target positions (a conveyance path and the like) 301 in the maintenance target device 300, two-dimensional barcodes 302 as an example of identification information are adhered or displayed. For example, the maintenance target device 300 can switch the display of the two-dimensional barcode 302 at a maintenance target position in accordance with an operation mode or the like. That is, the two-dimensional barcode 302 displayed at each maintenance target position is identification information according to the operation mode or the like. The information processing apparatus 200 includes a database DB that records execution of the maintenance operation. Note that the identification information may be identification information other than the two-dimensional barcode 302.

As shown in FIG. 3, the wearable terminal 100 includes a controller 111, a data memory 112, a RAM 113, a ROM 114, a communication unit 115, an input unit 116, a display 117, an out-camera 118, and an in-camera 119. The controller 111 is formed from a CPU (Central Processing Unit) or the like. The controller 111 executes a maintenance support application stored in the data memory 112 and executes maintenance support processing. The data memory 112 is a nonvolatile memory such as EEPROM®, FRAM®, or FLASH, and stores the maintenance support application. The RAM 113 functions as a working memory, and the ROM 114 holds a program to be executed by the controller 111.

Note that in this embodiment, a case in which a maintenance support application downloaded from outside is stored in the data memory 112 will be described. However, the wearable terminal 100 including the ROM 114 in which the maintenance support application is stored may be shipped.

The input unit 116 receives various kinds of inputs from the user. The display 117 is, for example, a transmissive display. The confirmer can view the maintenance target device 300 (maintenance target position 301) through the display 117, and can also view various kinds of information displayed on the display 117. Alternatively, the display 117 has a projection function, and the confirmer can view the maintenance target device 300 (maintenance target position 301) together with a projected image. The communication unit 115 communicates with the information processing terminal 200 and transmits various kinds of information.

The out-camera 118 and the in-camera 119 shoot different directions (for example, opposite directions). For example, when the user wears the wearable terminal 100, the out-camera 118 shoots the same direction as the viewpoint (direction) of the user, and the in-camera 119 shoots the pupil of the user. By analyzing the videos shot by the out-camera 118 and the in-camera 119, the image viewed by the user can be recorded, and the viewing situation can be analyzed.

The information processing terminal 200 is a general-purpose computer or the like, and includes a controller 211, an information storage unit 212, a RAM 213, a ROM 214, a communication unit 215, an input unit 216, and a display 217. The controller 211 is formed from a CPU or the like. The controller 211 executes a maintenance support application stored in the information storage unit 212 and executes maintenance support processing. The information storage unit 212 is a mass storage unit such as a hard disk, and stores a database configured to hold the maintenance support application and maintenance operation records. The RAM 213 functions as a working memory, and the ROM 214 holds a program to be executed by the controller 211.

Figure 4:
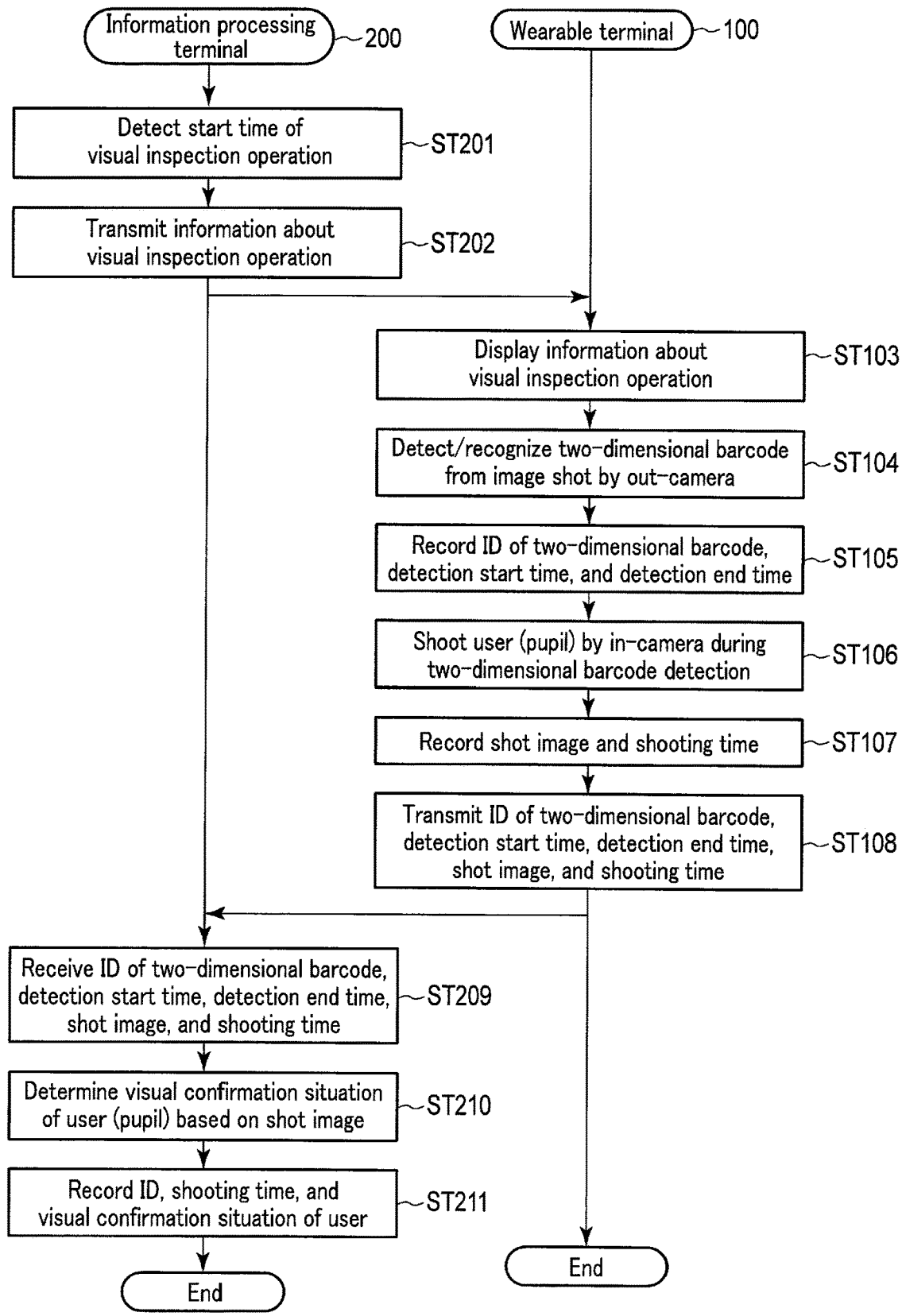
FIG. 4 is a flowchart showing an example of maintenance support processing by the maintenance support system according to the embodiment.

An example of maintenance support processing will be described below with reference to FIGS. 2, 3, and 4.

For example, the information storage unit 212 of the information processing terminal 200 stores the time schedule of a maintenance operation (for example, visual inspection). The controller 211 detects the start time of the visual inspection operation based on the time schedule and the current time (procedure (1)) (step ST201). The controller 211 detects the start time of the visual inspection operation, and the communication unit 215 transmits information about the visual inspection operation (operation start) (step ST202).

The communication unit 115 of the wearable terminal 100 receives the information about the visual inspection operation, and the display 117 displays the information about the visual inspection operation (step ST103) to prompt the confirmer to execute the maintenance operation. For example, the display 117 guides and displays an inspection point (the position of the two-dimensional barcode 302).

If the confirmer who wears the wearable terminal 100 views the inspection point, the out-camera 118 of the wearable terminal 100 can shoot the two-dimensional barcode 302 adhered in correspondence with the inspection point (procedure (2)). Alternatively, if a smartphone or tablet terminal is used in place of the wearable terminal 100, the confirmer holds the out-camera of the smartphone or tablet terminal over the two-dimensional barcode 302, and views the inspection point through the smartphone or tablet terminal in a state in which the two-dimensional barcode 302 is shot.

The out-camera 118 of the wearable terminal 100 shoots the viewpoint direction of the confirmer. The controller 111 detects the two-dimensional barcode 302 from the image shot by the out-camera 118, recognizes the two-dimensional barcode 302 (step ST104), and records the ID of the recognized two-dimensional barcode 302 and the detection start time and end time of the two-dimensional barcode 302 in the data memory 112 (procedure (3)) (step ST105). Note that the display 117 may display the ID of the two-dimensional barcode 302 and the detection start time and end time of the two-dimensional barcode 302 and record these displayed pieces of information in the data memory 112.

In addition, the in-camera 119 of the wearable terminal 100 shoots the pupil of the confirmer during detection of the two-dimensional barcode 302 (step ST106). The controller 111 records the pupil image and the shooting time in the data memory 112 (procedure (4)) (step ST107). For example, after the start of detection of the two-dimensional barcode 302, the in-camera 119 shoots the pupil of the confirmer, and the controller 111 records the shooting time and the pupil image in the data memory 112. Alternatively, the in-camera 119 continuously shoots the pupil of the confirmer and, after the start of detection of the two-dimensional barcode 302, the controller 111 acquires the shot pupil image and records the acquired pupil image and the shooting time in the data memory 112. The pupil image of the confirmer between the detection start time of the two-dimensional barcode 302 and the end time is thus acquired.

In addition, the communication unit 115 of the wearable terminal 100 transmits the ID of the two-dimensional barcode 302, the detection start time and end time of the two-dimensional barcode 302, the pupil image of the confirmer, and the shooting time of the pupil image of the confirmer (procedure (5)) (step ST108).

The communication unit 215 of the information processing terminal 200 receives the ID of the two-dimensional barcode 302, the detection start time and end time of the two-dimensional barcode 302, the pupil image of the confirmer, and the shooting time of the pupil image of the confirmer (step ST209). The controller 211 of the information processing terminal 200 confirms that the shooting time of the pupil of the confirmer is included between the detection start time of the two-dimensional barcode 302 and the end time and then analyzes the pupil image of the confirmer. The controller 211 determines the visual confirmation situation of the confirmer based on the analysis result of the shot pupil image of the confirmer (step ST210). For example, if the direction of the pupil of the confirmer is detected, and it is detected that the confirmer faces the front, the controller 211 determines that the confirmer is viewing the shooting direction of the out-camera 118 (procedure (6)).

The controller 211 of the information processing terminal 200 records the ID of the two-dimensional barcode 302, the shooting time of the pupil of the confirmer, the visual confirmation situation, and the like in the database (step ST211). For example, upon determining that the visual confirmation situation is good, the controller 211 records that the inspection point corresponding to the ID of the two-dimensional barcode 302 was correctly inspected by visual confirmation (procedure (7)).

According to the embodiment, the following effects can be obtained.

For example, it is possible to prevent the confirmer from making an unfair practice. The visual inspection is regarded as executed when the pupil of the pupil faces the front. Hence, if the confirmer does not execute the visual inspection operation, execution of the visual inspection is not recorded.

In addition, a human error in making an entry in a checklist can be prevented. Shooting of the pupil is executed during detection of the two-dimensional barcode 302 by the wearable terminal 100 or during display of the two-dimensional barcode 302 on the wearable terminal 100. For this reason, the confirmer properly views the inspection point. Even if the confirmer visually confirms a point that is not the inspection point (a point without the two-dimensional barcode 302), execution of the visual inspection is not recorded, and a human error can be prevented. Additionally, since all procedures are automatically processed by a machine, a human error such as an entry error can also be prevented.

Furthermore, that the visual inspection was executed at a predetermined angle and position can be recorded. The wearable terminal 100 recognizes the two-dimensional barcode 302 at the predetermined angle and position. For this reason, if the visual inspection is done at the predetermined angle and position, that the visual inspection was correctly executed is recorded.

According to the maintenance support system of this embodiment, maintenance support to be described below is also possible.

For example, the information storage unit 212 of the information processing terminal 200 stores maintenance operation information (for example, a maintenance operation manual) associated with an ID for each maintenance operation. For example, the maintenance operation information includes the procedure of the maintenance operation (position priority order). As described above, the wearable terminal 100 transmits the ID obtained by recognizing the two-dimensional barcode 302 to the information processing terminal 200. The information processing terminal 200 searches for maintenance operation information associated with the received ID, and transmits obtained maintenance operation information to the wearable terminal 100. The wearable terminal 100 displays the received maintenance operation information. That is, as described above, when the confirmer only views the maintenance target position (conveyance path or the like) 301 via the wearable terminal 100, the wearable terminal 100 can detect the two-dimensional barcode 302 at the maintenance target position and display the maintenance operation information associated with the ID of the two-dimensional barcode 302. Note that the wearable terminal 100 may store maintenance operation information associated with an ID for each maintenance operation in advance and search for and display the maintenance operation information based on the ID of the two-dimensional barcode 302. Accordingly, an operation result (visual confirmation situation and the like) corresponding to the maintenance operation information is recorded in the database of the information processing terminal 200.

In addition, the display contents of the maintenance operation information on the wearable terminal 100 can be updated by causing the wearable terminal 100 to communicate with the maintenance target device 300 or causing the wearable terminal 100 to communicate with the maintenance target device 300 via the information processing terminal 200. For example, if the maintenance target device 300 detects jam processing completion, consumable exchange completion, or the like, maintenance completion information is directly or indirectly transmitted to the wearable terminal 100. The wearable terminal 100 can update (erase) the display contents of the maintenance operation information based on the maintenance completion information.

If the maintenance target device 300 is a paper sheet processing apparatus, the wearable terminal 100 can read an image on a paper sheet (bill), extract and recognize the serial number of the paper sheet from the paper sheet image, and record the serial number. The wearable terminal 100 can also transmit the serial number to the information processing terminal 200. The information processing terminal 200 can thus record and manage the serial number of the paper sheet handled by the confirmer who wears the wearable terminal 100. For example, if the paper sheet processing apparatus stores a paper sheet collation/tracking list (serial number list), the information processing terminal 200 can determine whether the serial number transmitted from the wearable terminal 100 is included in the collation/tracking list and transmit the determination result to the wearable terminal 100. In this case, the wearable terminal 100 can display the determination result. Note that the wearable terminal 100 may store the paper sheet collation/tracking list (serial number list) and determine whether the read serial number is included in the paper sheet collation/tracking list (serial number list).

Furthermore, the security can be improved by making the out-camera 118 of the wearable terminal 100 continuously perform the shooting operation. That is, since the operation (hands) of the confirmer is always shot, the unfair practice and the like of the confirmer can be suppressed. By position detection, the wearable terminal 100 can prohibit shooting or automatically limit the shooting range in a no photography area. For example, the wearable terminal 100 can perform position detection for the two-dimensional barcode 302 based on the size and tilt of the two-dimensional barcode 302 detected from an image. The wearable terminal 100 may include a gyro sensor and perform position detection for the two-dimensional barcode 302 using a tilt detected by the gyro sensor, too.

When receiving support from an operator by remote processing, since the image shot by the out-camera 118 of the wearable terminal 100 is transmitted to the information processing terminal 200, the operator can view the image and thus transmit appropriate information (including no unnecessary information) from the information processing terminal 200 to the wearable terminal 100. In addition, since an image (face image) shot by the in-camera 119 of the wearable terminal 100 is transmitted to the information processing terminal 200, the operator can view the image and thus transmit appropriate information (including no unnecessary information) from the information processing terminal 200 to the wearable terminal 100 while viewing the point where the confirmer places focus during the operation. Alternatively, when the information processing terminal 200 extracts an image viewed by the confirmer from images shot by the out-camera 118 and images shot by the in-camera 119, the operator can transmit appropriate information (including no unnecessary information) from the information processing terminal 200 to the wearable terminal 100 while viewing the point where the confirmer places focus during the operation. In this way, the system can be used to improve the operability and maintainability. The system can also be used for support (instruction) by remote processing.

The system can also be applied to support manual inspection. An infrared image (IR image), a fluorescent image (F image), a waveform, or the like can be acquired by the out-camera 118 of the wearable terminal 100 and referred to. For example, using the above-described data search based on a serial number, when a teller in a bank or a cashier in a supermarket wears the wearable terminal 100 and performs a task, various kinds of images acquired by the wearable terminal 100 are transmitted to the information processing terminal 200. The information processing terminal 200 instantaneously determines the authenticity of a bill, and the wearable terminal 100 displays the determination result.

In addition, when the wearable terminal 100 is used, manual inspection can be done without touching an actual inspection target. This enables inspection from a remote site. Inspection is executed by a program in a cloud, and the inspection result is received from a data center.

Conventionally, if a jam or failure occurs in a paper sheet processing apparatus or the like, a customer engineer in a remote site is notified of it and sent to do a maintenance operation on site. Until the customer engineer arrives at the site, the paper sheet processing apparatus or the like is at rest. This time is the major factor to lower the operation efficiency. According to the embodiment, since the wearable terminal 100 outputs the next operation instruction, the operator can execute the maintenance operation in accordance with the operation instruction. This can improve the device operation efficiency.

Since the wearable terminal 100 can also display a maintenance manual according to the maintenance target position, the maintenance manual browsing properties can also be improved. Furthermore, data management can be performed based on a serial number included in an image from the wearable terminal 100. This enables paper sheet authenticity determination or the like.

Note that all processes of the wearable terminal 100 and the information processing terminal 200 can be executed by several pieces of software (maintenance support programs). Hence, the processes can easily be implemented only by installing several programs configured to execute the above-described processing procedures in the wearable terminal 100 and the information processing terminal 200 via a computer-readable storage medium that stores the programs and executing the programs. For example, the wearable terminal 100 and the information processing terminal 200 can download the programs via a network, store the downloaded programs, and complete installation of the programs. Alternatively, the wearable terminal 100 and the information processing terminal 200 can read the programs from an information storage medium, store the read programs, and complete installation of the programs.

According to this embodiment, it is possible to provide a maintenance support method, a maintenance support system, and a maintenance support program, which are excellent in correctly recording a maintenance operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A maintenance support method performed by a wearable device including a plurality of cameras, which shoot different targets, and an information processing apparatus, the method comprising:

causing the wearable device to detect identification information of a maintenance target position from a first image shot by the plurality of cameras and transmit the identification information and a second image shot by the plurality of cameras to the information processing apparatus; and causing the information processing apparatus to receive the identification information and the second image, determine, based on the second image, a situation of a user who wears the wearable device, and record the situation of the user in association with the identification information, wherein the wearable device transmits the identification information, a detection start time and a detection end time of the identification information, the second image, and a shooting time of the second image to the information processing apparatus, and the information processing apparatus receives the identification information, the detection start time, the detection end time, the second image, and the shooting time, determines the situation of the user based on the detection start time, the detection end time, the second image, and the shooting time, and records the situation of the user in association with the identification information.

2. The method according to claim 1, wherein the information processing apparatus detects a pupil of the user from the second image, determines a viewing direction of the user from the pupil, determines a visual confirmation situation of the maintenance target position by the user based on the viewing direction, and records the visual confirmation situation of the user in association with the identification information.

3. The method according to claim 1, wherein the wearable device transmits the second image shot between the detection start time and the detection end time to the information processing apparatus.

4. A non-transitory computer-readable medium comprising a maintenance support program that causes a computer to execute:

detecting identification information of a maintenance target position from a first image shot by a plurality of cameras of the wearable device;

transmitting the identification information and a second image shot by the plurality of cameras;

receiving the identification information and the second image;

determining, based on the second image, a situation of a user who wears the wearable device; and recording the situation of the user in association with the identification information, wherein
the transmitting comprises transmitting the identification information, a detection start time and a detection end time of the identification information, the second image, and a shooting time of the second image,
the receiving comprises receiving the identification information, the detection start time, the detection end time, the second image, and the shooting time,
the determining comprises determining the situation of the user based on the detection start time, the detection end time, the second image, and the shooting time, and
the recording comprises recording the situation of the user in association with the identification information.

5. The medium according to claim 4, wherein the determining comprises detecting a pupil of the user from the second image, detecting a viewing direction of the user from the pupil, and determining a visual confirmation situation of the maintenance target position by the user based on the viewing direction, and
the recording comprises recording the visual confirmation situation of the user in association with the identification information.

6. The medium according to claim 4, wherein the transmitting comprises transmitting the second image shot between the detection start time and the detection end time.

7. A maintenance support system comprising a wearable device including a plurality of cameras, which shoot different targets, and an information processing apparatus,
wherein the wearable device
is configured to detect identification information of a maintenance target position from a first image shot by the plurality of cameras, and
transmit the identification information and a second image shot by the plurality of cameras to the information processing apparatus, and the information processing apparatus
is configured to receive the identification information and the second image,
determine, based on the second image, a situation of a user who wears the wearable device, and
record the situation of the user in association with the identification information;
wherein
the transmitting comprises transmitting the identification information, a detection start time and a detection end time of the identification information, the second image, and a shooting time of the second image,
the receiving comprises receiving the identification information, the detection start time, the detection end time, the second image, and the shooting time,
the determining comprises determining the situation of the user based on the detection start time, the detection end time, the second image, and the shooting time, and
the recording comprises recording the situation of the user in association with the identification information.

8. The system according to claim 7, wherein the information processing apparatus detects a pupil of the user from the second image, detects a viewing direction of the user from the pupil, determines a visual confirmation situation of the maintenance target position by the user based on the viewing direction, and records the visual confirmation situation of the user in association with the identification information.

9. The system according to claim 7, wherein the wearable device transmits the second image shot between the detection start time and the detection end time to the information processing apparatus.

* * * * *